Oct. 7, 1969 J. C. ARCHER 3,471,599
METHOD OF CONSTRUCTING A CONTAINMENT
AND RADIATION SHIELDING SYSTEM
Filed Jan. 20, 1966
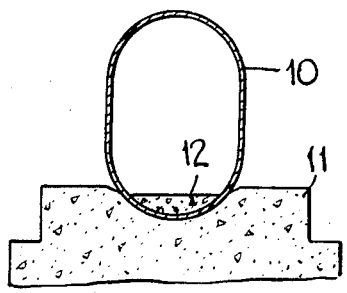
Fig.1.
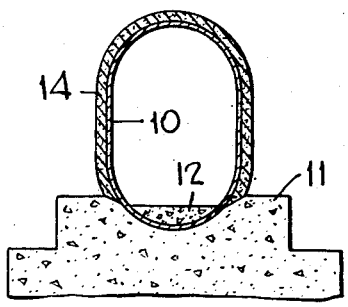
Fig.2.
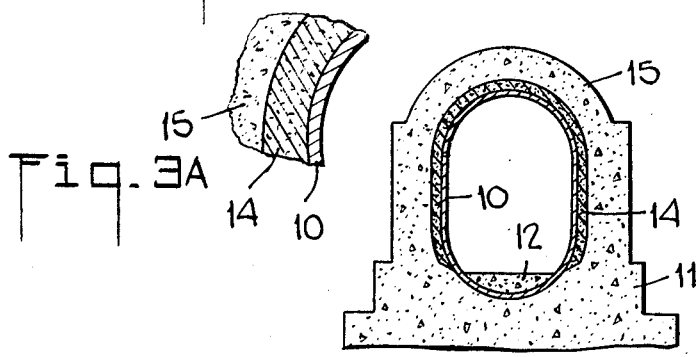
Fig.3A
Fig.3.
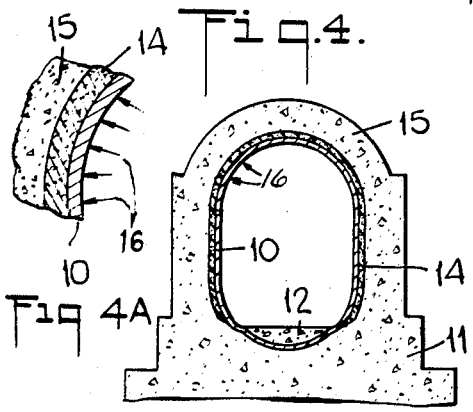
Fig.4. Fig.4A
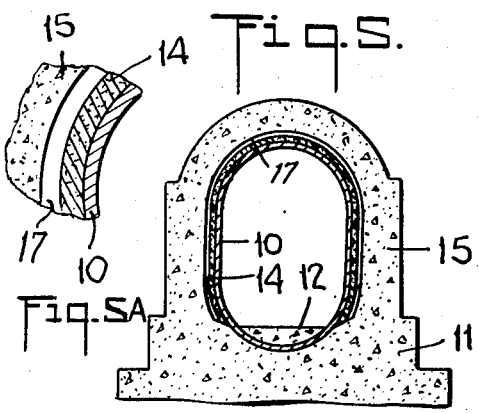
Fig.5. Fig.5A
INVENTOR.
JOHN CARDIFF ARCHER
BY
ATTORNEYS United States Patent Office 3,471,599
Patented Oct. 7, 1969

3,471,599
METHOD OF CONSTRUCTING A CONTAINMENT AND RADIATION SHIELDING SYSTEM
John Cardiff Archer, Brooklyn, N.Y., assignor to Burns and Roe, Inc., New York, N.Y., a corporation of New Jersey
Filed Jan. 20, 1966, Ser. No. 521,770
Int. Cl. B28b 7/30, 19/00
U.S. Cl. 264—32                                   4 Claims

ABSTRACT OF THE DISCLOSURE

Method of constructing a containment and radiation shielding system by applying a layer of substantially inelastic, compressible material to the exterior surface of an expansible vessel, providing a radiation resistant shield on the outer surface of the material and expanding the vessel to compress the material between the vessel and shield.

---

This invention relates to containment and radiation shielding systems and methods of constructing same, and more particularly to a system and method of constructing such a system for a nuclear reactor.

Nuclear reactors are required to be enclosed within a structure capable of providing a shield against radiation and of resisting such pressures, missiles and jet forces as may be expected to result from any credible malfunction of the reactor or failure of its primary cooling system. To prevent the uncontrolled release of radioactive gases and particulate matter, the structure provided to resist the maximum credible accident pressure is commonly a leak-tight steel pressure vessel proven by test to have a maximum leak rate of the order of a small percentage of its volume per day at the accident pressure.

Shielding against radiation has been provided by massive concrete walls outside or inside the steel pressure vessel, or both. The credible pressures normally associated with a failure of a reactor system are generally held to well under 100 p.s.i.g., i.e. such as require a relatively thin walled steel vessel. This is accomplished by providing a sufficiently large volume within the containment, by allowing controlled release of the contained atmosphere and, where the accident pressure is due to accidental release of steam, through pressure suppression by condensation of the steam. However, such a vessel has little capability for resisting the concentrated forces resulting from the impact of missiles or jet forces. Consequently, at least a part of the shielding concrete is normally required to be constructed inside the containment vessel in order to protect the vessel from these concentrated loads. Placing this shield within the contained volume increases the required size, and thus cost, of the containment vessel and results in corresponding increases in cost of the mechanical ventilating system handling the contained atmosphere and the size and cost of that part of the radiation shield constructed outside of the larger containment vessel.

Those skilled in the art appreciate that the most economical containment vessel and shield would comprise a vessel of the minimum size necessary to house the reactor and its primary cooling system, and a radiation shield immediately against the outside of the vessel to back it up, thus preventing local failure of the thin walled vessel under concentrated loads of missile and jet forces. This would result in the further economics of reducing the geometry of the radiation shield to the absolute minimum possible outside of containment and of utilizing the containment vessel as a form for the construction of the concrete shield.

However, in order to function as a pressure container, the steel vessel must be allowed to expand when in its stressed condition under the accident pressure. It is also subject to thermal expansion since it will be exposed to operating and accident temperatures significantly higher than an ambient temperature practical to maintain during construction. Restraint of expansion of the pressure vessel by the concrete radiation shield would transmit the accident pressure to the concrete shield thus necessitating its being reinforced with an added amount of steel. The steel vessel would then function only as a leak-tight lining for a concrete containment structure but, with its thermal expansion restrained, it would be subject to buckling and possible rupture under operating conditions.

Thus the most economical and practical arrangement of radiation shield immediately outside the containment vessel can be used only if a space is provided between shield and vessel sufficiently large to allow the expansion of the steel vessel expected under maximum temperature and pressure but sufficiently small that, although local yielding of the steel vessel may occur under concentrated missile or jet forces, yielding to the extent causing rupture would be prevented. This maximum limit precludes the use of a conventional concrete forming system and, if the wall is to be cast in place, requires the application of a material to the outside of the vessel which can be removed after concrete placement or, if it is to be left in place, is sufficiently compressible to allow expansion of the vessel.

A removable separating medium between vessel and concrete is conceivable in the form of a friable material which would be broken up and extracted, or as a pneumatically or mechanically collapsible form. However, such an arrangement does not appear to be practically desirable. Thus, for the usual containment system the size of a multi-story building, the separating medium would have to be removed in steps as the construction of the concrete shield advanced. This procedure would expose the completed portion of the expansion space in the lower region to becoming obstructed during the progress of construction above. The limitation on the width of the gap would make it impractical to remove such obstacles or even to detect them.

On the other hand, compression characteristics of a material to be left in place between the vessel and the concrete would necessarily be such that it would not deflect significantly under the fluid pressure of concrete, some 3 to 5 p.s.i. A number of commercially available compressible materials such as are commonly employed as insulation or fire-proofing can be formulated so as to have the necessary resistance to compression under the fluid pressure of concrete while remaining sufficiently compressible to be capable of about 50 percent reduction in thickness under pressures of the order of about 15 to 20 p.s.i.

As noted, thin walled steel pressure vessels are vulnerable to concentrated loads and are also inefficient in resisting external pressure. Thus, an external pressure significantly greater than 3 to 5 p.s.i. would be expected to require a greater vessel shell thickness than that required to resist the normal range of bursting pressures for which containment vessels are designed. If the vessel could be assumed to be under internal pressure in excess of the resistance offered by the compressible material whenever it was caused to expand, this resistance would not be of concern in the design of the vessel. However, while a significant increase in temperature, and thus thermal growth of the vessel, from the ambient temperature during construction to the ambient temperature during reactor operation must be expected, a positive pressure within the containment vessel during operation is avoided in order to prevent out leakage of the radioactively contaminated contained atmosphere. Thus, the high operating temperatures and low operating pressures would cause the shell to buckle due to thermal expansion if prevented from expanding outwardly as would be the case with a compressible material, such as that mentioned, between the vessel and outer massive shield.

Thus, I have conceived by my invention a system and method of constructing same which overcomes the foregoing difficulties and disadvantages.

Essentially, I eliminate the need for providing a balancing internal pressure within the expanded vessel by providing a substantially inelastic, compressible material as the separating medium between the vessel and shield, and conditioning the system by heating the vessel to a temperature at least as high as the maximum temperature unaccompanied by elevated pressure postulated under operating or accident conditions, and simultaneously pressurizing the vessel to expand same thus to compress the material between the vessel and shield. Upon subsequent contraction of the vessel, a space will remain between it and the shield which will allow for expansion of the vessel at postulated accident or operating temperature unaccompanied by elevated pressure, thus to obviate buckling of the vessel.

As stated, I utilize as the compressible material one which will not deflect significantly under the fluid pressure of concrete, about 3 to 5 p.s.i. but which will assume about a 50 percent reduction in thickness under pressure of the order of about 15 to 20 p.s.i. When this material is applied to the outer surface of the steel vessel, the concrete may be poured onto the material which will not significantly deform under the fluid pressure, but will serve as the inside concrete form. As mentioned, after the concrete has set, the unit cannot be brought to operating conditions because at the relatively low operating pressure necessitated by the need to prevent leakage and the resistance to expansion offered by the uncompressed material between the vessel and shield, the vessel, unable to expand outwardly, would buckle at operating temperature.

Accordingly, after the concrete has set, I raise the temperature and pressure within the vessel to compress the material between it and the shield. Upon contraction then, a space is left between vessel and shield to permit expansion under operating temperature.

As some materials which may be employed between the vessel and shield may bond to both surfaces and tear or shred upon contraction of the vessel, I may cover the material with a sheet of suitable plastic to prevent it bonding to the concrete.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

FIG. 1 is a schematic view of a steel pressure vessel mounted on a permanent support;

FIG. 2 illustrates a layer of inelastic, compressible material applied to the outer surface of the vessel;

FIG. 3 illustrates a concrete radiation shield constructed outside the vessel;

FIG. 3A is an enlarged fragmentary view of a portion of FIG. 3;

FIG. 4 is similar to FIG. 3 but with the vessel in expanded condition;

FIG. 4A is an enlarged fragmentary view of a portion of FIG. 4;

FIG. 5 is similar to FIGS. 3 and 4 but shows the system ready for operation; and FIG. 5A is an enlarged fragmentary view of a portion of FIG. 5.

Referring now to FIG. 1 of the drawings, there is shown a steel vessel 10 mounted on a permanent concrete support platform 11 and containing a concrete base 12 upon which the reactor (not shown) will be mounted. FIG. 2 shown the vessel 10 with a coating or layer 14 of substantially inelastic, compressible material referred to herein on its outer surface. I have found that a composition formed of asbestos fibres, magnesite and epson salt manufactured by All Purpose Fireproofing Corporation of New Hyde Park, New York and available commercially under the trade name "Fire-Bar Type D" is suitable for my purpose when mixed at the job site with water and a foaming agent to form an emulsion which may be sprayed on the surface of the vessel 10 to assume the configuration shown in FIG. 2.

As shown in FIG. 3, the concrete 15 may be poured onto the surface of the layer 14 which acts as the inner wall form for the concrete. FIG. 3A serves to illustrate the relative dispositions of the vessel 10, layer of compressible material 14 and concrete 15 when the latter has set. It will be appreciated that conventional wood forms may be used to form the outer concrete configuration.

Turning now to FIGS. 4 and 4A I have illustrated schematically by means of arrows the expansion of the vessel 10 outwardly to compress the layer 14 preferably to an extent such that upon contraction of the vessel, the material 14 no longer occupies space required for expansion of the vessel. This initial expansion is accomplished by heating the vessel at least to the maximum temperature postulated under any future unpressurized operating or accident condition while simultaneously pressurizing the vessel to prevent buckling during this initial expansion.

FIGS. 5 and 5A illustrates the relative dispositions of the vessel 10, the layer 14 and the concrete shield 15 after the vessel has been allowed to contract by reducing the pressure and temperature to ambient. The layer 14 is shown adhered to the vessel 10 and compressed to about 50 percent of its original thickness thus to define with the inner surface of the shield 15 an empty space 17 for the purposes herein noted.

By way of example, in a typical system maximum credible accident pressure and temperature are of the order of 62 p.s.i.g. and 280° F., respectively, and operating pressure and temperature are of the order of 140° F. and —¼″ of water respectively. In this case, assuming a 70-foot diameter vessel, the maximum limit of expansion of any part of the steel vessel is of the order of 1 inch.

From the foregoing description it will be seen that I contribute a system and method of constructing same wherein empty space for expansion of a nuclear reactor containment vessel at postulated unpressurized operating or accident temperature is provided between vessel and massive radiation shield to prevent buckling of the vessel.

I believe that the method and construction of my novel system will now be understood, and that the advantages of my invention will be fully appreciated by those persons skilled in the art.

I claim:

1. Method of constructing a containment and radiation shielding system which comprises: applying a layer of substantially inelastic, compressible material to the exterior surface of an expansible vessel, providing a radiation resistant shield on the outer surface of said material and expanding said vessel by heating said vessel to a temperature at least as high as the maximum temperature unaccompanied by elevated pressure postulated under operating or accident conditions and simultaeously pressurizing the vessel to compress said material between said vessel and shield.

2. Method of constructing a containment and radiation shielding system which comprises: applying a layer of substantially inelastic, compressible material to the exterior surface of an expansible metal vessel, pouring a fluid concrete layer on the outer surface of said material, allowing same to set into a massive shield and expanding said vessel by heating said vesesl to a temperature at least as high as the maximum temperature unaccompanied by elevated pressure postulated under operating or accident conditions and simultaneously pressurizing the vessel to compress said inelastic material to an extent whereby upon contraction of said vessel a space remains between said vessel and shield to allow for expansion without rupture of the vessel.

3. Method of constructing a containment and radiation resistant system which comprises: applying to the exterior surface of an expansible metal vessel a layer of substantially inelastic, compressible material characterized in that it will not deflect significantly under a pressure of the order of 3 to 5 p.s.i. but is capable of about a 50 percent reduction in thickness under pressure of the order of 15 to 20 p.s.i., pouring a fluid concrete layer on the outer surface of said material, allowing same to set into a massive shield, introducing into said vessel a pressure and temperature sufficient to expand said vessel and compress said material between said vessel and shield to a desired reduction in thickness, and allowing said vessel to contract.

4. Method according to claim 3, further characterized by applying means between said material and concrete to prevent bonding of said material to said concrete.

References Cited
UNITED STATES PATENTS

| | | | |
|---|---|---|---|
| 1,964,870 | 7/1934 | Chappell | 52—224 X |
| 1,965,748 | 7/1934 | Mitchell | 264—228 X |
| 2,903,018 | 9/1959 | Goff | 264—35 X |
| 3,106,227 | 10/1963 | Crowley | 52—224 X |
| 3,320,969 | 5/1967 | Gordon | 52—249 X |

ROBERT F. WHITE, Primary Examiner

K. J. HOVET, Assistant Examiner

U.S. Cl. X.R.

52—741; 264—88, 255